(12) United States Patent
Koistra et al.

(10) Patent No.: US 7,392,874 B2
(45) Date of Patent: Jul. 1, 2008

(54) REAR WHEEL SUSPENSION

(76) Inventors: Charles Koistra, P.O. Box 77561, Corona, CA (US) 92877; Yunes A. Nabilsi, 11938 South St., Artesia, CA (US) 90701

(*) Notice: Subject to any disclaimer, the term of this patent is extended or adjusted under 35 U.S.C. 154(b) by 321 days.

(21) Appl. No.: 11/218,087

(22) Filed: Aug. 31, 2005

(65) Prior Publication Data
US 2007/0045024 A1 Mar. 1, 2007

(51) Int. Cl.
*B62K 11/02* (2006.01)
(52) U.S. Cl. .................. 180/227; 280/284; 280/285
(58) Field of Classification Search ............. 180/227; 280/284, 285
See application file for complete search history.

(56) References Cited
U.S. PATENT DOCUMENTS

| | | | |
|---|---|---|---|
| 3,948,543 A | 4/1976 | Macdonald et al. | |
| 4,434,868 A * | 3/1984 | Brenner et al. | 180/226 |
| 4,515,236 A | 5/1985 | Kanamori | |
| 4,653,604 A | 3/1987 | de Cortanze | |
| 4,662,469 A * | 5/1987 | Matsuda et al. | 180/219 |
| 4,735,277 A * | 4/1988 | Prince | 180/227 |
| 5,279,383 A | 1/1994 | Gustafsson | |
| 2004/0140141 A1* | 7/2004 | Soatti | 180/226 |

* cited by examiner

*Primary Examiner*—Lesley D. Morris
*Assistant Examiner*—Marlon Arce-Diaz
(74) *Attorney, Agent, or Firm*—Clement Cheng

(57) ABSTRACT

A rear wheel suspension system for a motorcycle has a swing arm with a pivot axis at a forward end and a wheel axis at a rear end. A wheel axle is slide mounted in a direction of travel substantially parallel to the motorcycle fork. A pair of springs mounted within the swing arm biases the wheel axle in forward neutral position and pulls the wheel axle to forward neutral position when the wheel is forced backward.

8 Claims, 7 Drawing Sheets

REAR WHEEL SUSPENSION

FIELD OF THE INVENTION

This invention relates to wheel suspension.

BACKGROUND OF THE INVENTION

Wheel suspension is a very important component of motorcycle performance. Good suspension provides superior handling, improved balance and improved comfort. In motorcycle systems, the rear wheel is typically a separate suspension system and has a different suspension design than the front wheel. A variety of the current rear wheel motorcycle suspension systems commonly mount the rear wheel on a swing arm that rotates about a fixed axis. The motion control of the swing arm is generally a shock absorber and spring system that controls the rotation of the swing arm. In motorcycle embodiments, this has proved useful to some degree. U.S. Pat. No. 3,948,543 to Macdonald, et al. granted Apr. 6, 1976 was an early patent in presenting a rear wheel shock absorber translating substantially upward impact forces into a substantially horizontal force. U.S. Pat. No. 5,279,383 to Gustafsson provides a composite leaf spring suspension mounted under the motorcycle limiting the angular rotation of the pivot arm. U.S. Pat. No. 4,653,604 to de Cortanze shows a complicated three arm lever rotatably mounted on a lever axle. U.S. Pat. No. 4,515,236 to Kanamori provides a five-pivot axis system for maintaining control of the angular rotation of the pivot arm.

In off-road racing, fallen logs and large boulders can prove to be an obstacle to even a seasoned rider. Clearing the front wheel over an obstacle is generally fairly straightforward as the rider can shift weight. The rear wheel however can strike an obstacle and pull the rider off the off-road motorcycle or cause loss of balance. The rear wheel collision can also damage the off-road motorcycle. Off-road four-wheel vehicles also have the same problem with rear wheel collision. Riders need an improved suspension system for a motorcycle rear wheel to provide an enhanced ride on extremely rugged surfaces and have enhanced rear wheel collision recovery.

BRIEF DESCRIPTION OF THE PREFERRED EMBODIMENT

Figure 1:
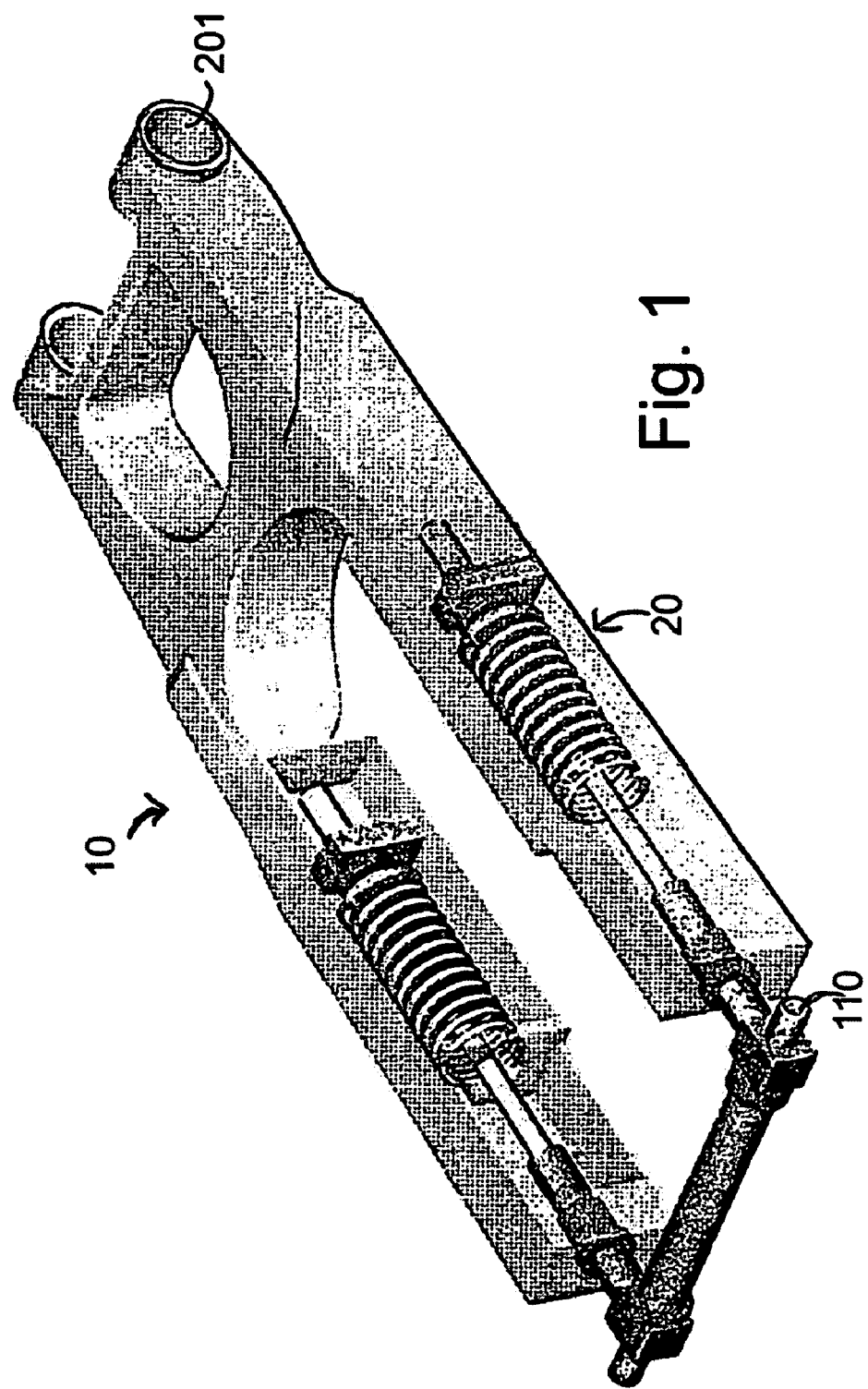
FIG. 1 is a perspective view of the present invention having a pair of springs and shock systems enclosed within housings held within the fork.
Figure 2:
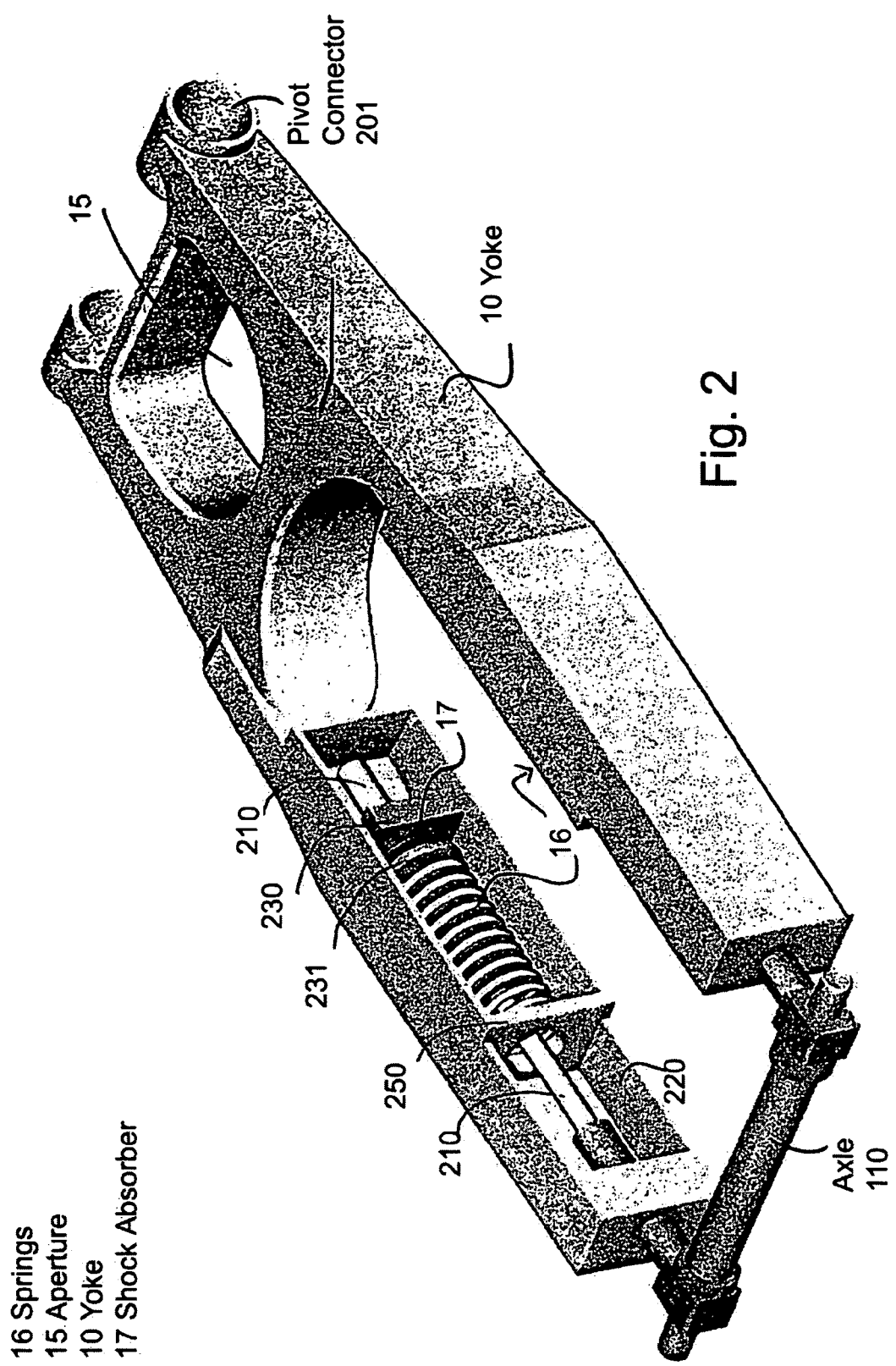
FIG. 2 is a perspective view of the invention with the cover of the shock system removed.

The improved suspension system for motorcycle rear wheel includes a swing arm or fork 10 that has a wheel axle 110 on a longitudinal suspension mounted on a shock system 20. The wheel axle is slidingly mounted in a direction of travel substantially parallel to the motorcycle fork. The classic pivot connector 201 allows rotational movement of the swing arm 10 during vehicle operation. The swing arm is formed as a fork providing a large aperture for the wheel and a small aperture 15. The swing arm 10 is preferably made of a cast or milled section of lightweight aluminum metal. The swing arm 10 supports the weight of the motorcycle and is a typical motorcycle swing arm.

The improved suspension system can also be used on other vehicles besides a motorcycle, but a motorcycle is the preferred embodiment. The swing arm 10 preferably mounted so as to be substantially horizontal with a higher forward end and a lower rear end.

The shock system 20 activates when the rear wheel strikes an object and axle 110 is pulled away from the motorcycle engaging springs in the shock system 20. The shock system 20 has a pair of large springs for absorbing impact given to the rear wheel. During impact against the rear wheel, the axle 110 is extended in rearward position against the shock system 20. The springs retract the axle 110 after impact and bias the wheel in the neutral position that is the most forward position. In neutral position, the springs of the shock system 20 exert the least force against the axle 110. The springs of the shock system 20 do not push the axle 110 to the rear, but only bias the axle 110 toward the forward neutral position.

The pivoting connector 201 is a standard connector that connects the swing arm 10 against the frame of the motorcycle. The pivoting connector attaches to the frame of the motorcycle or the engine of the motorcycle. The connector 201 is shown as a pair of tubular coaxial spaced apart members joined to the swing arm 10. The connector configuration 201 has other obvious embodiments that have been described at length in the prior art.

The fork 10 forms a housing 220 retaining a spring 16 and a dampener 17 threaded on an elongated rod 210. The cushioning dampener 17 absorbs high-frequency vibrations as well as top out shock when the spring restores to an equilibrium forward position. The elongated rod 210 slides and moves in translation forward in the direction of travel and rearward. The fork 10 generally remains parallel to the ground. A retention member 230 restricts the rod to sliding motion alone so that a bulged section 231 presses the spring in compression against the spring bottom 250 and retains the springs 16 and cushioning dampener 17. Bulged section 231 is preferably integrally formed from the same piece of metal as the elongated rod 210. The bulge section 231 retains the top portion of the spring and does not allow relative movement between bulge section 231 and the spring 16.

The spring bottom 250 has an opening with the elongated rod 210 that slides during back and forth movement of axle 110. The elongated rod 210 slides through the retaining member 230. The shock system includes the springs 16 and shock absorbers 17 mounted inside the fork 10 having an enclosed cover. The cushioning damper 17 is located between the spring 16 and the retention member 230.

Furthermore, a chain tensioner also called a derailleur not shown in the drawings but common in the art retains the chain against the gear. A wide variety of commercially available chain tensioners can be installed to keep the chain taught.

The swing arm 10 is formed as a fork with an aperture 15 allowing a shock absorber or shock system to be mounted. The springs 16 absorb shock when a motorcycle's rear wheel hits an object and receives force that engages it to be pulled away from the user. The shock absorbers allow the wheel to be pulled away from the fork and then restore back into neutral starting position. The shock systems appear in pairs and operate approximately horizontal or less than 30 degrees from horizontal such that objects or terrain struck during motorcycle riding have horizontal shock control. The wheel axle is slidingly mounted substantially parallel to the motorcycle fork.

Figure 3:
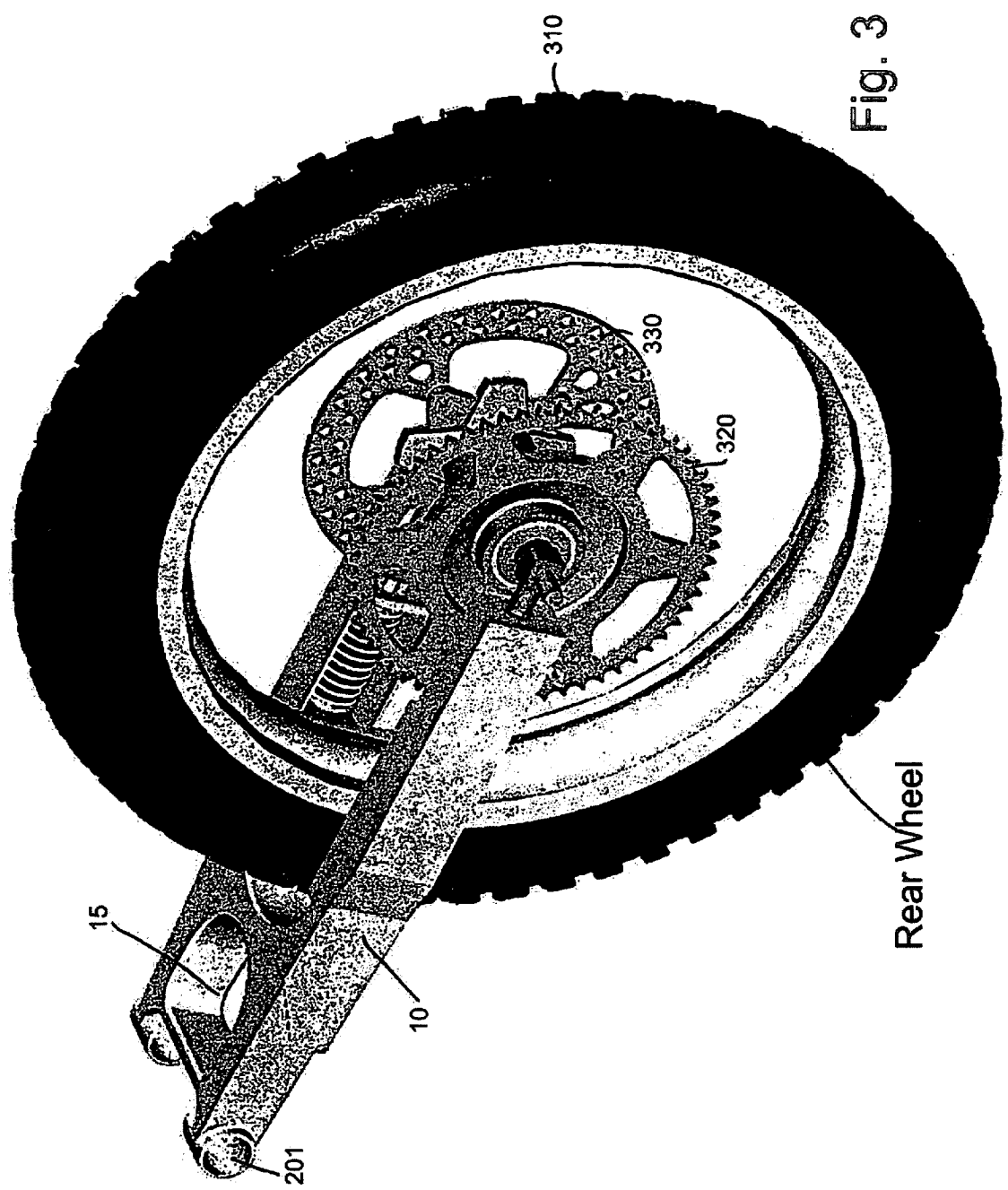
FIG. 3 is a left side perspective view.

FIG. 3 shows the wheel placed between the left and right shock system. The vehicle rear tire 310 can be sized according to the fork 10, and the fork 10 can be sized according to the rear tire 310. The rear wheel has a power sprocket 320 receiving driving force and a brake assembly 330 receiving brake pads mounted on calipers mounted on the fork 10. The rear tire 310 has a clearance with the fork at the forward portion of the fork. The rear tire 310 can be pulled back away from the motorcycle and the swing arm retaining the rear tire 310.

Figure 4:
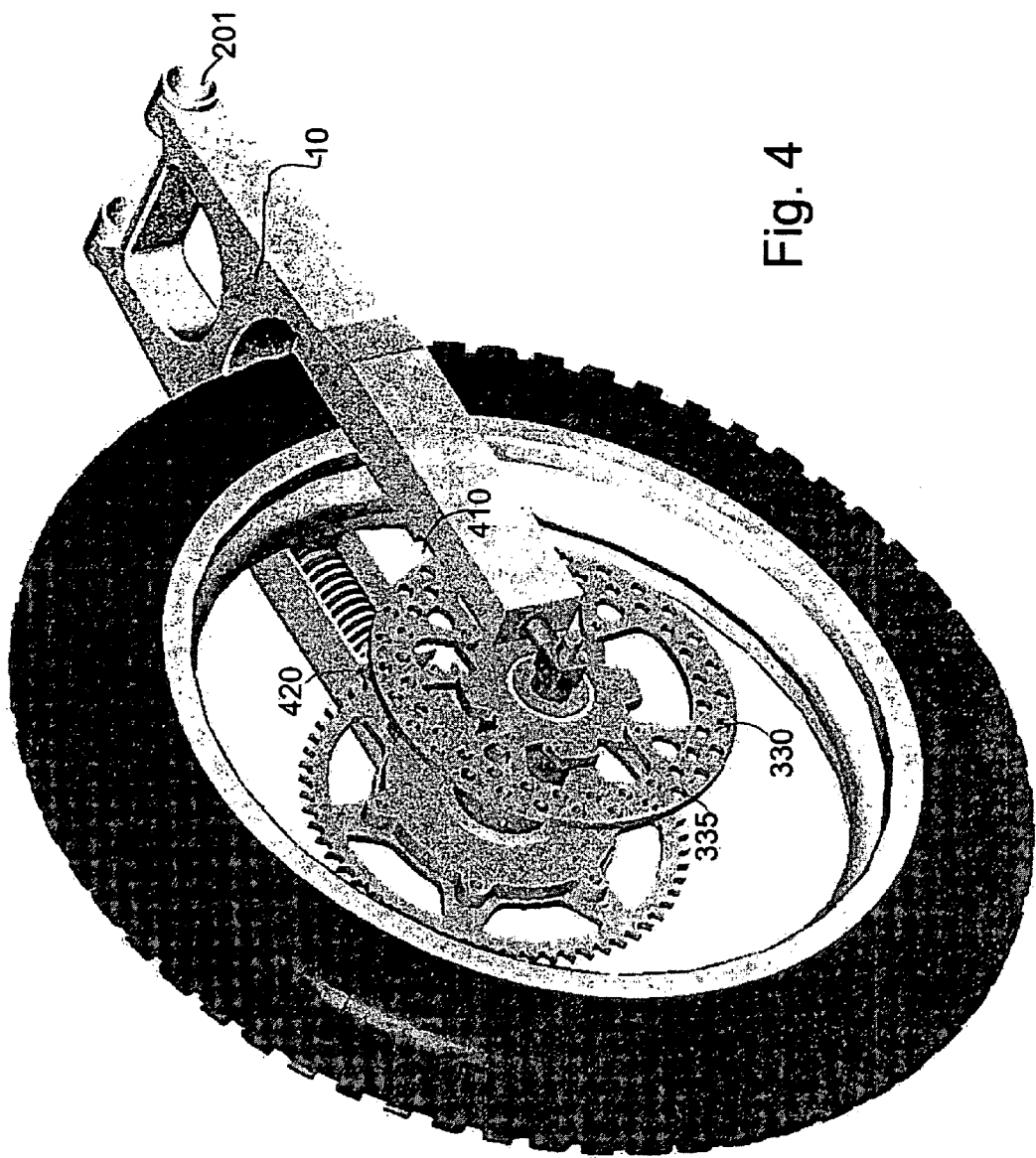
FIG. 4 is a right side perspective view.
Figure 5:
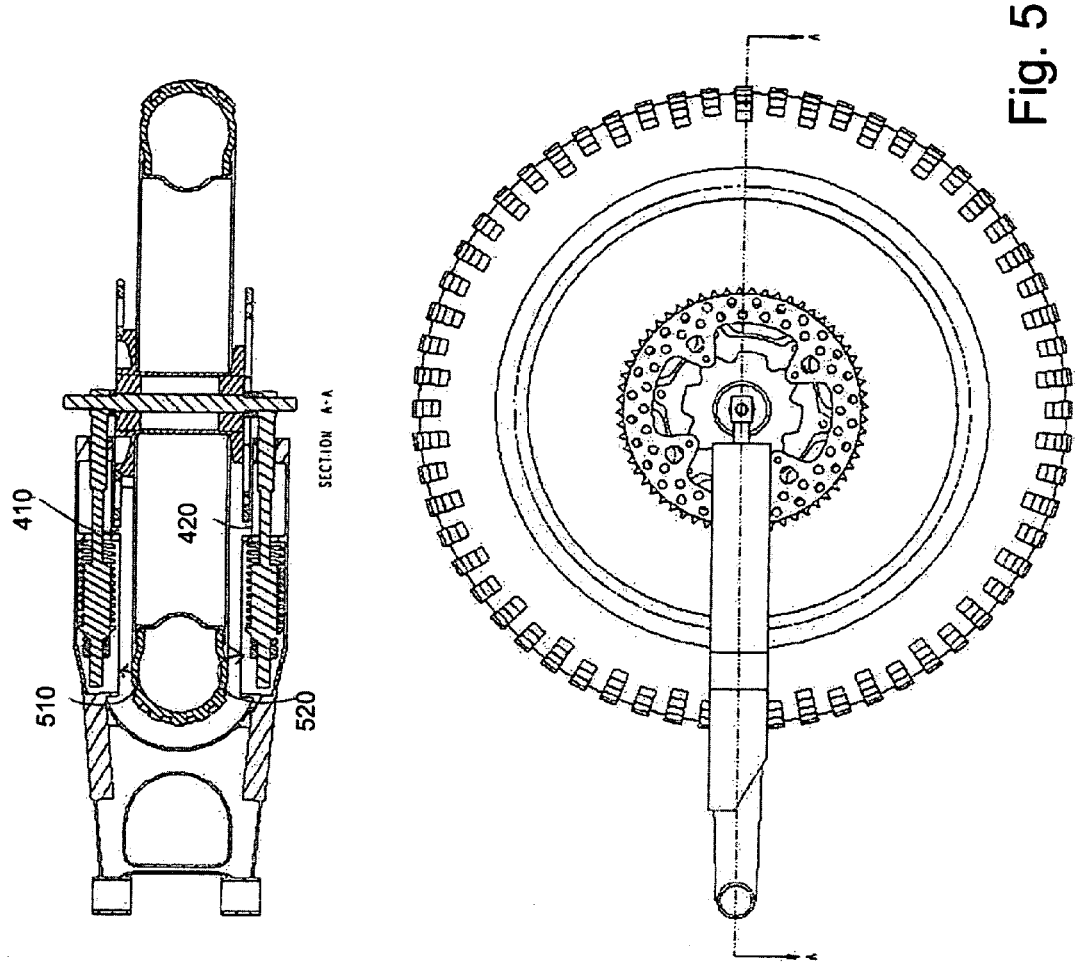
FIG. 5 is a top cross section view of the invention at a cross section along line A shown on an upside down right side view.
Figure 6:
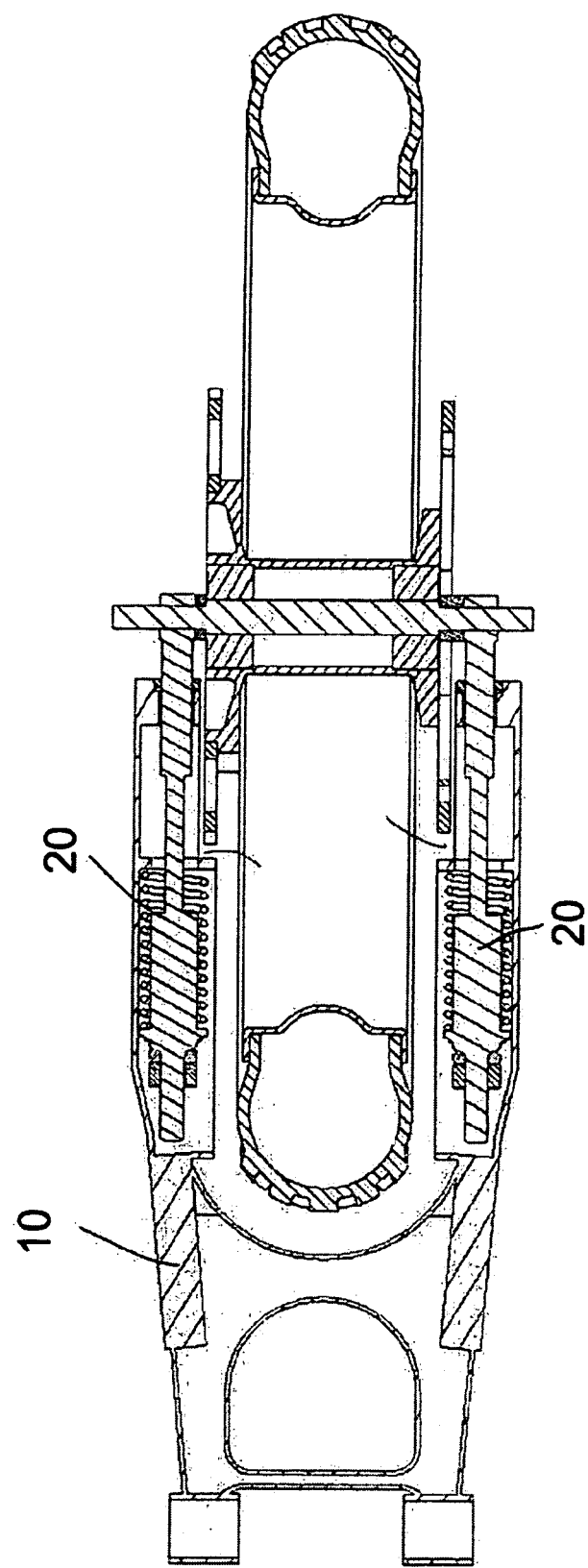
FIG. 6 is a top cross section view.
Figure 7:
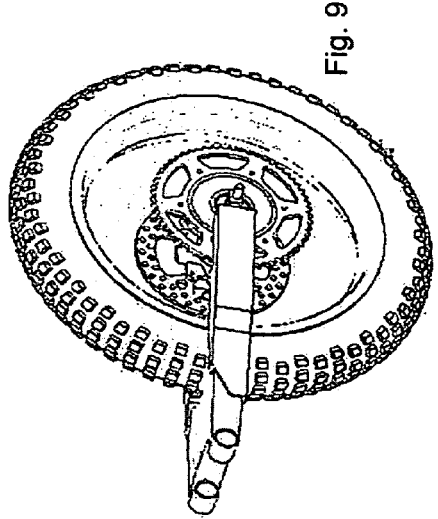
FIG. 7 is a right side perspective view.
Figure 8:
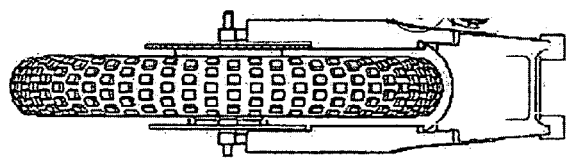
FIG. 8 is a top view.
Figure 9:
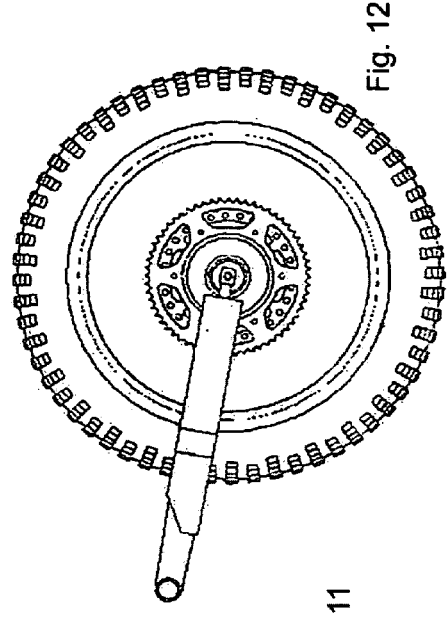
FIG. 9 is a left side perspective view.
Figure 11:
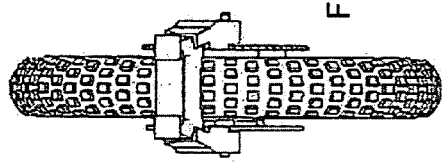
FIG. 11 is a front view.
Figure 10:
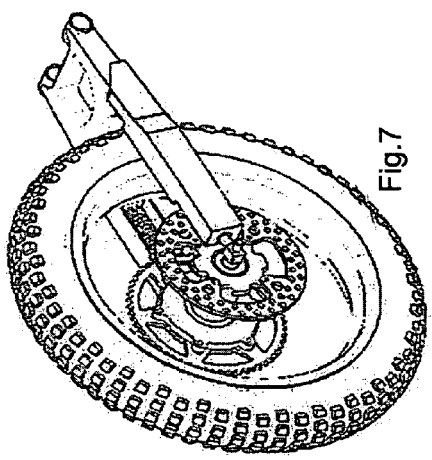
FIG. 10 is a right side view.
Figure 12:
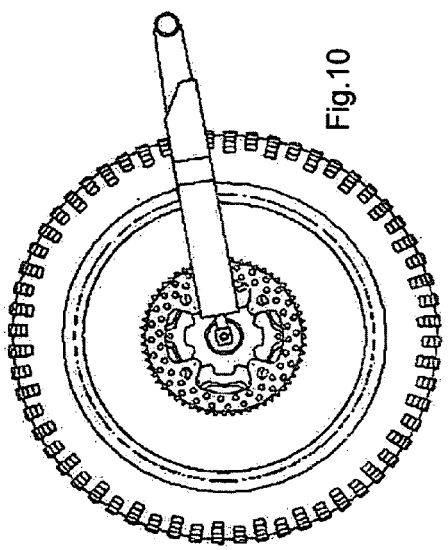
FIG. 12 is a left side view.

The brake rotor assembly 330 has a pair of surfaces allowing opposing contact by a pair of caliper brake pads. Apertures 335, FIG. 4 in the brake assembly 330 rotor provide superior adhesion between brake caliper and rotor. The brake rotor assembly 330 is mounted opposite of the power sprocket 320. Generally, the power sprocket 320 is mounted on the left side and the brake rotor assembly 330 is mounted on the right side. The power sprocket 320 is mounted inside of the swing arm assembly 10 and the brake rotor assembly 330 is also mounted inside of the swing arm assembly 10.

The swing arm assembly features a pair of conforming recesses on the inside of the left and right surfaces of the swing arm near the brake rotors assembly 330 and the power sprocket 320. A right conforming recess 410 provides a small clearance between the swing arm 10 and the brake rotor assembly 330. The left conforming recess 420 provides a small clearance between the swing on 10 and the power sprocket 320. The brake rotor assembly 330 and the power sprocket 320 preferably align with the inside surface of the swing arm 10.

Although the present embodiment has a neutral position, the shock system can be adjusted so that tension remains within the springs when the wheel axle is in the forward most position. This tensioned spring alternate embodiment is useful depending upon the type of travel by the rear wheel. On rugged terrain, the tension setting can be set higher. The tension can be adjusted by interchanging springs that are held within the swing arm 10 and enclosed within the swing arm 10. The swing arm 10 has openings with covers covering the openings. A user opens the cover of the opening to access the springs.

The invention claimed is:

1. A rear wheel suspension system for a motorcycle comprising: a swing arm having a pivot axis at a forward end and a wheel axis at a rear end; a wheel axle slidingly mounted in a direction of travel substantially parallel to the motorcycle fork; and a pair of springs mounted within the swing arm biasing the wheel axle in forward neutral position and pulling the wheel axle to forward neutral position when the wheel is forced backward; further comprising a pair of elongated rods slidingly within the swing arm on a left and right side of the swing arm engaging the pair of springs and a pair of cushioning dampers wherein the pair of cushioning dampers is located between the pair of springs and a retention member.

2. A rear wheel suspension system for a motorcycle comprising: a swing arm having a pivot axis at a forward end and a wheel axis at a rear end; a wheel axle slidingly mounted in a direction of travel substantially parallel to the motorcycle fork; and a pair of springs mounted within the swing arm biasing the wheel axle in forward neutral position and pulling the wheel axle to forward neutral position when the wheel is forced backward; further comprising a pair of elongated rods slidingly within the swing arm on a left and right side of the swing arm engaging the pair of springs and a pair of cushioning dampers further comprising a bulge section in the pair of elongated rods wherein each bulge section retains a top portion of each spring and does not allow relative movement between bulge section and each spring.

3. A rear wheel suspension system for a motorcycle comprising: a swing arm having a pivot axis at a forward end and a wheel axis at a rear end; a wheel axle slidingly mounted in a direction of travel substantially parallel to the motorcycle fork; and a pair of springs mounted within the swing arm biasing the wheel axle in forward neutral position and pulling the wheel axle to forward tensioned position when the wheel is forced backward; further comprising a pair of elongated rods slidingly within the swing arm on a left and right side of the swing arm engaging the pair of springs and a pair of cushioning dampers.

4. The rear wheel suspension system of claim 3, wherein the pair of cushioning dampers is located between the pair of springs and a retention member.

5. The rear wheel suspension system of claim 3, further comprising a bulge section in the pair of elongated rods wherein each bulge section retains a top portion of each spring and does not allow relative movement between bulge section and each spring.

6. The rear wheel suspension system of claim 3, wherein the swing arm has a pair of conforming recesses providing a low clearance between the swing arm and power sprocket and providing a low clearance between the swing arm brake rotor assembly; further comprising a pair of elongated rods slidingly within the swing arm on a left and right side of the swing arm engaging the pair of springs and a pair of cushioning dampers.

7. The rear wheel suspension system of claim 6, wherein the pair of cushioning dampers is located between the pair of springs and a retention member.

8. The rear wheel suspension system of claim 6, further comprising a bulge section in the pair of elongated rods wherein each bulge section retains a top portion of each spring and does not allow relative movement between bulge section and each spring.

\* \* \* \* \*